United States Patent
Struble et al.

(10) Patent No.: US 6,296,280 B1
(45) Date of Patent: Oct. 2, 2001

(54) ADAPTIVE COLLAPSIBLE STEERING COLUMN

(75) Inventors: Rex R. Struble, Clarkston; Ernst M. Faigle, Dryden, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/433,594

(22) Filed: Nov. 2, 1999

(51) Int. Cl.⁷ ....................................................... B62D 1/99
(52) U.S. Cl. .............................................. 280/777; 74/492
(58) Field of Search .................. 280/777, 779; 74/492

(56) References Cited

U.S. PATENT DOCUMENTS

| | | |
|---|---|---|
| 4,886,295 | 12/1989 | Browne . |
| 5,167,850 | 12/1992 | Shtarkman . |
| 5,176,368 | 1/1993 | Shtarkman . |
| 5,655,757 | 8/1997 | Starkovich et al. . |
| 6,116,648 * | 9/2000 | Holly et al. ............................ 280/777 |
| 6,152,488 * | 11/2000 | Hedderly et al. ..................... 280/777 |

FOREIGN PATENT DOCUMENTS 6-87453 * 3/1994 (JP) ...................................... 280/779

* cited by examiner

Primary Examiner—Eric Culbreth
(74) Attorney, Agent, or Firm—Tarolli, Sundheim, Covell, Tummino & Szabo L.L.P.

(57) ABSTRACT

An apparatus for supporting a steering wheel (22) of a vehicle (10) comprises a first steering column part (32) and a second steering column part (34). The apparatus also comprises supporting structure (46) supporting the first steering column part (32) and the vehicle steering wheel (22) for movement relative to the second steering column part (34) along an axis (36) of the steering column (12). The apparatus further comprises an energy absorbing device (20) interposed between the first steering column part (32) and the second steering column part (34) for resisting movement of the first part relative to the second part. The energy absorbing device (20) comprises a fluid (50) having a shear strength which varies in response to an energy field acting on the fluid. The apparatus also includes means (54, 60) for varying the shear strength of the fluid (50) by varying the energy field to vary the resistance to movement of the first steering column part (32) relative to the second steering column part (34).

9 Claims, 2 Drawing Sheets

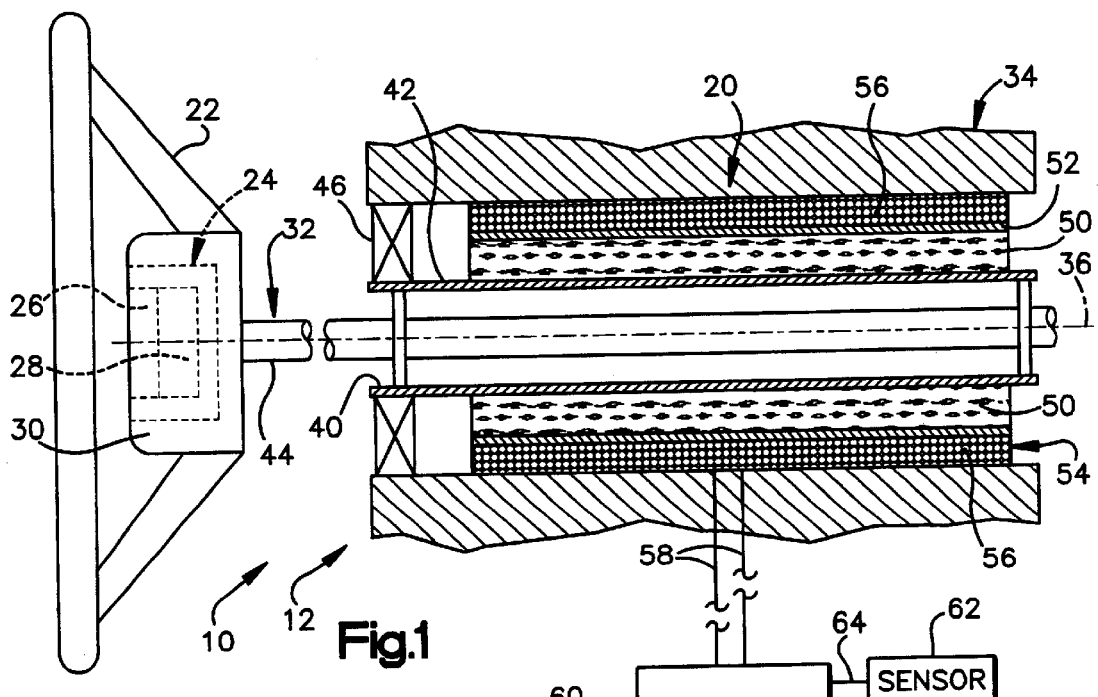
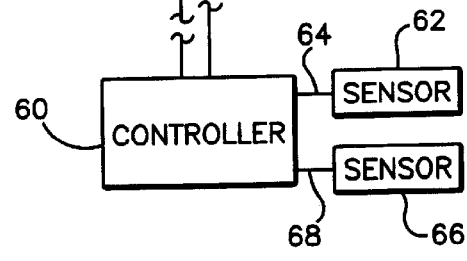
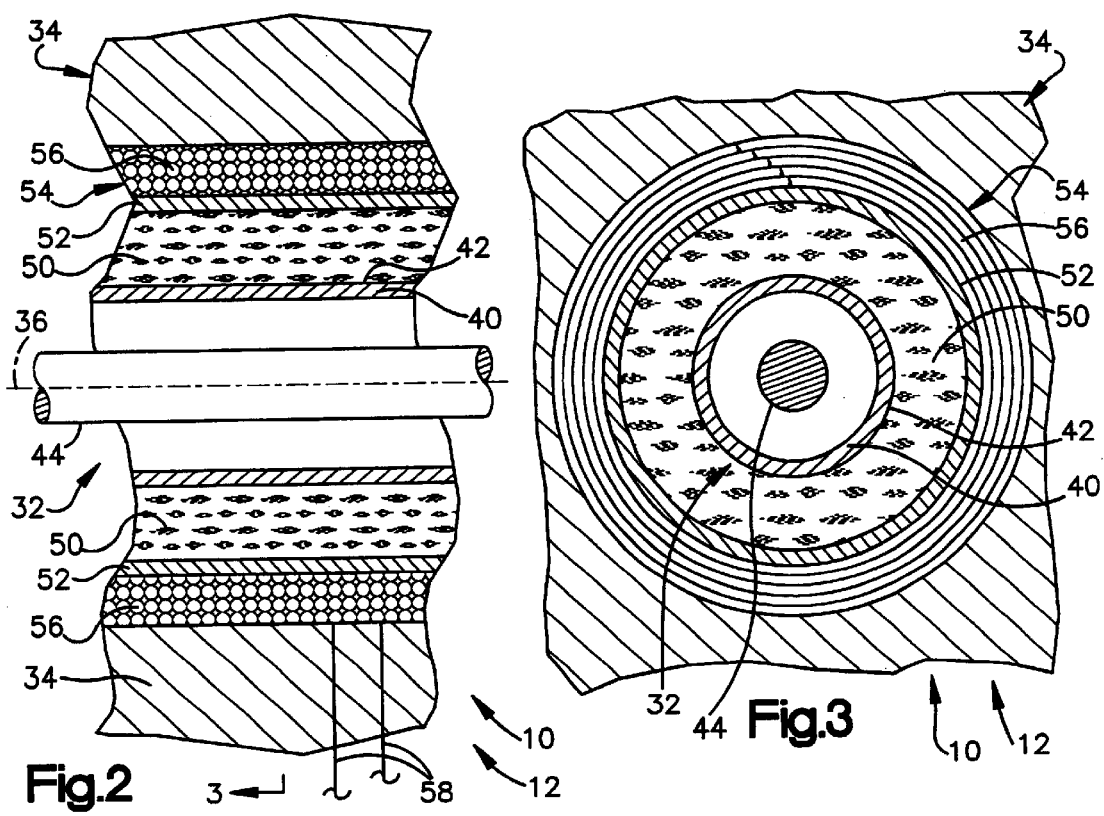

ADAPTIVE COLLAPSIBLE STEERING COLUMN

BACKGROUND OF THE INVENTION

1. Technical Field

The present invention relates to an energy absorbing device for a collapsible steering column in which the resistance to collapsing can be varied.

2. Description of the Prior Art

U.S. Pat. No. 4,886,295 describes a vehicle occupant protection system including a collapsible steering column. An energy absorber is located between two relatively movable sections of the steering column. The energy absorber includes an inflatable bag. The vehicle has electric circuitry, including sensors for sensing vehicle and occupant conditions, that controls the state of inflation of the inflatable bag to vary the energy absorbing capacity of the steering column.

It is known to use electrorheological fluid in an energy absorber for an engine mount or another structure having two relatively movable parts. Typical structures incorporating such a fluid are disclosed in U.S. Pat. Nos. 5,176,368 and 5,655,757. Varying the strength of an energy field acting on the fluid can vary the apparent viscosity of the fluid, thus controlling the energy absorption characteristics of the device.

SUMMARY OF THE INVENTION

The present invention is an apparatus for supporting a steering wheel of a vehicle. The apparatus comprises a first steering column part and a second steering column part. The apparatus also comprises supporting structure supporting the first steering column part and the vehicle steering wheel for movement relative to the second steering column part along an axis of the steering column. The apparatus further comprises an energy absorbing device interposed between the first steering column part and the second steering column part for resisting movement of the first part relative to the second part. The energy absorbing device comprises a fluid having a shear strength which varies in response to an energy field acting on the fluid. The apparatus also includes means for varying the shear strength of the fluid by varying the energy field to vary the resistance to movement of the first steering column part relative to the second steering column part.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of an apparatus including an energy absorbing device constructed in accordance with the present invention;

FIG. 2 is an enlarged sectional view of a portion of the energy absorbing device of FIG. 1;

FIG. 3 is a sectional view taken along line 3—3 of FIG. 2;

DESCRIPTION OF PREFERRED EMBODIMENTS

Figure 4:
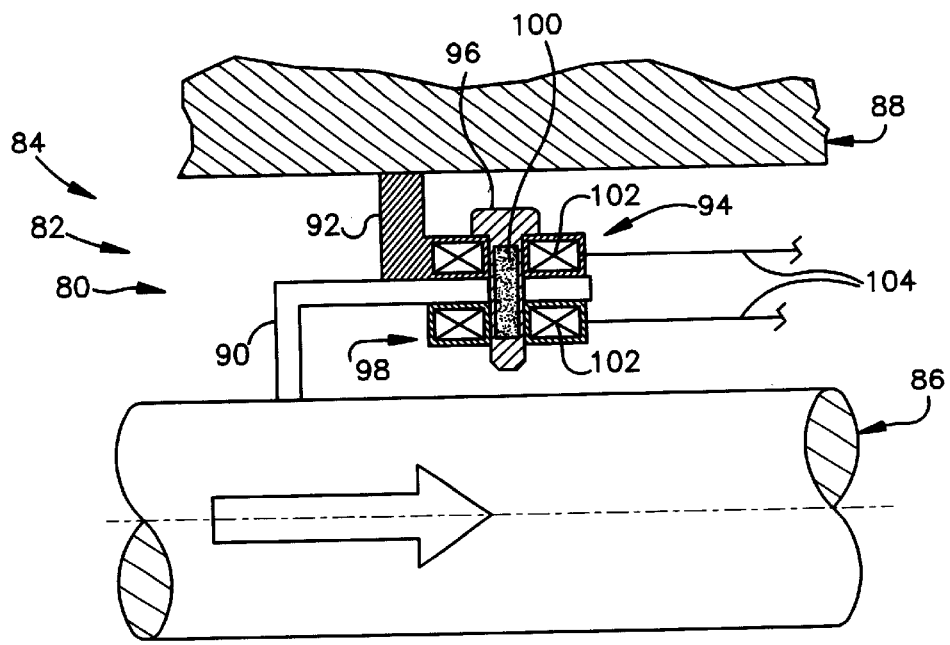
FIG. 4 is a schematic illustration of an apparatus including an energy absorbing device constructed in accordance with a second embodiment of the present invention.

The present invention relates to an energy absorbing device for a collapsible steering column in which the resistance to collapsing under load can be varied. As representative of the present invention, FIG. 1 illustrates schematically a portion of a vehicle 10 that includes a steering column 12. The steering column 12 is a collapsible steering column that incorporates an energy absorbing device 20 in accordance with the invention.

The vehicle 10 includes a steering wheel 22 for effecting directional control of the vehicle. An air bag module 24 is mounted on the steering wheel 22. The air bag module 24 includes an air bag 26 and an inflator 28 within a cover 30. The cover 30 is adapted to open easily upon inflation of the air bag 26.

The steering wheel 22 is supported on the steering column 12 of the vehicle 10. The steering column 12 includes a first steering column part 32 that is movable relative to a second steering column part 34 along an axis 36 of the steering column.

The first steering column part 32 includes a cylindrical tube 40 centered on the axis 36. The tube 40 has a cylindrical outer side surface 42. The first steering column part 32 also includes a shaft 44 that extends coaxially within the tube 40 and is rotatable with the tube. The steering wheel 22 is supported on the shaft 44 for rotation with the shaft. The second steering column part 34, only a portion of which is shown, is fixed to the vehicle structure. One or more bearings, and/or other structure, indicated schematically at 46, support the first part 32 for movement relative to the second part 34.

The tube 40 and the shaft 44 rotate upon rotation of the steering wheel 22. In the event of sudden vehicle deceleration, if the driver of the vehicle 10 contacts the steering wheel 22 with sufficient force, the first part 32 of the steering column 12 is movable axially relative to the second part 34, to collapse the steering column and thereby to reduce the load on the driver.

The energy absorbing device 20 controls movement of the first part 32 relative to the second part 34. The energy absorbing device 20 is interposed between the first and second parts 32 and 34.

The energy absorbing device 20 includes a quantity of fluid 50. The fluid 50 is a fluid whose shear strength can be varied by applying an energy field to the fluid. The fluid 50 is preferably an electrorheological magnetic fluid whose shear strength can be varied by controlling the strength of a magnetic field applied to the fluid. The fluid 50 can, alternatively, be an electrorheological fluid whose shear strength can be varied by controlling the voltage of an electric field applied to the fluid.

The fluid 50 is contained in a fluid capsule 52 fixed to the second part 34 of the steering column 12. The fluid capsule 52 has an annular configuration extending around the first part 32 of the steering column 12. The cylindrical outer surface 42 of the tube 40 extends through and is in engagement with the fluid 50. Seals, not shown, contain the fluid 50 in the capsule 52.

The energy absorbing device 20 also includes a coil 54 that has a plurality of windings 56. The windings 56 extend around the fluid capsule 52. The windings 56, when energized by an electric current over lead wires 58, generate a magnetic field which extends through and acts on the fluid 50. The lead wires 58 are connected to a controller 60, such as a microprocessor, described below in more detail.

The vehicle 10 includes one or more occupant condition sensors indicated schematically at 62. The occupant condition sensors 62 may be any of several known types. The occupant condition sensors 62 are operative to sense the position of the driver relative to the steering wheel 22, or the size or weight of the driver, and to provide an appropriate output signal over lead wires indicated schematically at 64.

The vehicle 10 also includes one or more vehicle condition sensors 66. The vehicle condition sensors 66 may be any of several known types. For example, one of the vehicle condition sensors 66 may be a deceleration sensor such as a mechanical inertia switch or an electrical accelerometer. One of the vehicle condition sensors 66 may also be a proximity sensor such as a radar unit that senses the distance between the vehicle 10 and an object in front of the vehicle. The vehicle condition sensors 66 provide an appropriate output signal over lead wires indicated schematically at 68.

The controller 60 is operatively connected by the lead wires 64 and 68 to the vehicle condition sensors 66 and to the occupant condition sensors 62. The controller 60 incorporates one of several crash algorithms known in the art for discriminating between deployment and non-deployment crash conditions and, in response, determining whether to deploy the air bag 26.

Specifically, in the event of a deployment crash condition involving sudden vehicle deceleration, or other event for which protection of the vehicle occupant may be desired, the sensors 62 and 66 provide appropriate output signals that are inputs to the controller 60. The controller 60 compares the outputs of the sensors 62 and 66 with outputs found in a look-up table, for example. Depending on the outcome of this comparison, the controller 60 determines whether or not to actuate the inflator and deploy the air bag 26.

The controller 60 also controls the operation of the energy absorbing device 20 in response to the outputs of the vehicle condition sensors 66 and the occupant condition sensors 62. Control of the energy absorbing device 20 may be responsive to the vehicle crash severity as sensed by the vehicle condition sensor 66. It may also be responsive to the size, weight, and/or position of the driver, or to any other factor which may be useful in determining how much resistance the steering column 12 should offer under load.

Specifically, during operation of the vehicle 10, the controller 60 periodically checks the outputs of the vehicle condition sensors 66 and the occupant condition sensors 62, and adjusts or presets the strength of the magnetic field generated by the windings 56. Depending on sensed vehicle conditions, such as the rate of speed of the vehicle 10, or the proximity of objects in front of the vehicle, the controller 60 can vary the strength of the magnetic field.

For example, at a relatively high rate of vehicle speed, or with a relatively close proximity of an object in front of the vehicle 10, the controller 60 can increase the strength of the magnetic field. This increase causes the fluid 50 to increase in apparent viscosity and shear strength. The increase in shear strength of the fluid 50 makes it more difficult for the tube 40, which is in contact with the fluid, to move axially through the fluid capsule 52. This increases the resistance to collapsing of the steering column 12 under driver load.

The controller 60 simultaneously determines how to set the condition of the fluid 50 as a result of sensed occupant conditions. For example, if the driver is relatively close to the steering wheel 22, or is relatively small or light in weight, then the controller 60 can decrease the strength of the magnetic field. This decrease causes the fluid 50 to decrease in apparent viscosity and shear strength. The decrease in shear strength of the fluid 50 makes it easier for the tube 40, which is in contact with the fluid, to move axially through the fluid capsule 52. This decreases the resistance to collapsing of the steering column 12 under driver load.

In the event of a deployment crash condition involving sudden vehicle deceleration, or other event for which protection of the vehicle occupant may be desired, the sensors 62 and 66 provide appropriate output signals that are inputs to the controller 60, for the purpose of adjusting the shear strength of the fluid 50. The controller 60 determines, on the basis of these output signals, whether the preset shear strength of the fluid 50 is appropriate for the sensed vehicle conditions and occupant conditions. The controller 60 compares the outputs of the sensors 62 and 66 with outputs found in a look-up table, for example. Depending on the outcome of this comparison, the controller 60 determines whether or not to adjust the preset shear strength of the fluid 50.

For example, in the event of a sensed crash condition of relatively high severity, the driver will have a relatively large amount of kinetic energy to be absorbed by the energy absorbing device 20. The controller 60 can cause the strength of the magnetic field to be increased. This increase in the magnetic field strength causes the fluid 50 to increase in apparent viscosity and shear strength, and thus increases the resistance to collapsing of the steering column 12 under driver load. Alternatively, in the event of a sensed crash condition of relatively low severity, the driver will have a relatively low amount of kinetic energy to be absorbed by the energy absorbing device 20. The controller 60 can cause the strength of the magnetic field to be decreased. This decrease in the magnetic field strength causes the fluid 50 to decrease in apparent viscosity and shear strength and thus decreases the resistance to collapsing of the steering column 12 under driver load.

Another example, the controller 60 determines at the onset of the crash event whether to change the preset condition of the fluid 50 on the basis of sensed occupant conditions. For example, if the driver is relatively close to the steering wheel 22, at the onset of the crash event, then the controller 60 can decrease the strength of the magnetic field. This decrease causes the fluid 50 to decrease in apparent viscosity and shear strength. The decrease in shear strength of the fluid 50 makes it easier for the tube 40, which is in contact with the fluid, to move axially through the fluid capsule 52. This decreases the resistance to collapsing of the steering column 12 under driver load.

Similarly, if the occupant condition sensors indicate that the driver is relatively far from the steering wheel 22 at the onset of the crash condition, then the controller 60 can increase the strength of the magnetic field to increase the resistance to collapsing of the steering column 12 under driver load.

Vehicle and occupant conditions can change during the duration of the crash event, in ways that would make it desirable to change the energy absorbing capacity of the energy absorbing device 20. The present invention is advantageous in that the viscosity of the fluid 50 can be changed within a very short period of time, for example, in a few milliseconds. The sensors and the controller 60 are operative to sense changing conditions during the crash event and adjust the shear strength of the fluid 50 accordingly during the crash event. As a result, the resistance to collapsing of the steering column 12 can be varied during the duration of the crash event, instead of just once at the onset of the crash event, to provide more optimal driver protection.

FIG. 4 illustrates an energy absorbing device 80 constructed in accordance with a second embodiment of the invention. The energy absorbing device 80 is a portion of a steering column 82 of a vehicle 84. The steering column 82 includes a movable first part 86 and a fixed second part 88. Connected for movement with the first part 86 is the steering wheel (not shown) of the vehicle 84.

A bracket or other structure shown schematically at 90 is connected to the first part 86 of the steering column 82 for movement with the first part. Another bracket or other structure shown schematically at 92 is fixed to the second part 88 of the steering column 84 for movement with the second part.

The brackets 90 and 92 are interconnected by a shear bolt assembly 94. The shear bolt assembly 94 includes a shear bolt 96 and a coil assembly 98. The shear bolt 96 extends through and mechanically interconnects the brackets 90 and 92. The shear bolt 96 thus resists movement of the first part 86 of the steering column 84 relative to the second part 88 of the steering column.

The shear bolt 96 has a cavity in which is a quantity of electrorheological magnetic fluid 100. The coil assembly 98 extends around the shear bolt 96. The coil 98 contains a plurality of windings 102 which are energizable by an electric current over lead wires 104. When the windings 102 are energized, the coil 98 generates a magnetic field that acts on the electrorheological magnetic fluid 100. The strength of the magnetic field affects the apparent viscosity and the shear strength of the electrorheological magnetic fluid 100.

As the shear strength of the electrorheological magnetic fluid 100 varies, so does the overall shear strength of the shear bolt 96. Thus, controlling the strength of the magnetic field controls the shear strength of the bolt 96 and, thereby, the amount of force that is needed to resist movement of the first part 86 of the steering column 84 relative to the second part 88 of the steering column.

The vehicle 84 includes vehicle condition sensors and occupant condition sensors and a controller (not shown), like those illustrated in the first embodiment of the invention. The sensors and the controller are operative in the same manner as those described above with respect to FIGS. 1–3 to control the shear strength of the fluid 100 and thus the amount of force that is needed to resist movement of the first part 86 of the steering column 84 relative to the second part 88 of the steering column 84. This control is limited, however, to only setting the resistance at which the steering column 84 will initially collapse; there is no control during a crash event.

Figure 5:
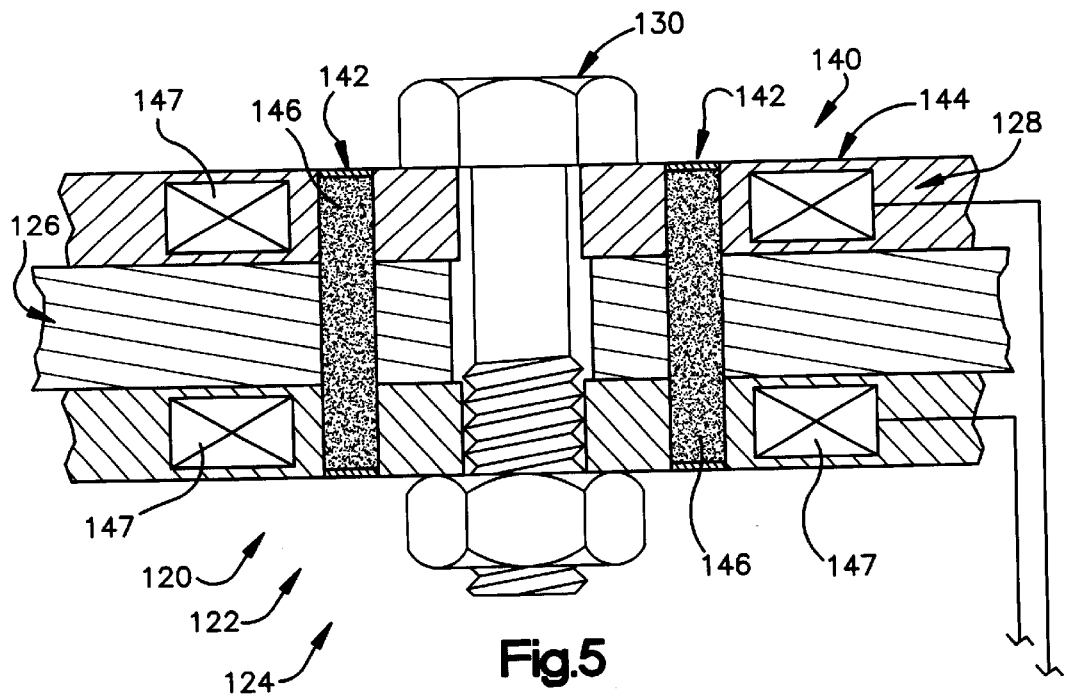
FIG. 5 is a schematic illustration of an apparatus including an energy absorbing device constructed in accordance with a third embodiment of the present invention.

FIG. 5 illustrates an energy absorbing device 120 constructed in accordance with a third embodiment of the invention. The energy absorbing device 120 is included in a steering column 122 of a vehicle 124. The steering column 122 includes a first part 126 movable relative to a second part 128. Connected for movement with the first part 126 is the steering wheel (not shown) of the vehicle 124. A fastener 130 releasably clamps the two parts 126 and 128 together, blocking their relative movement.

The first and second parts 126 and 128 of the steering column 122 are also releasably interconnected by a shear capsule assembly 140. The shear capsule assembly 140 includes a shear capsule 142 and a coil assembly 144. The shear capsule 142 extends through the first and second parts 126 and 128 of the steering column 122. The shear capsule 142 is filled with an electrorheological magnetic fluid 146.

The coil assembly 144 extends around the shear capsule 142. The coil assembly 144 contains a plurality of windings 147 which are energizable by an electric current over lead wires 148. When the windings 147 are energized, the coil assembly 144 generates a magnetic field that acts on the electrorheological magnetic fluid 146 in the shear capsule 142. The strength of the magnetic field affects the shear strength of the fluid 146.

When it is desired that the first part 126 of the steering column 122 not move relative to the second part 128 of the steering column, the coil assembly 144 is energized to provide a magnetic field that maximizes the shear strength of the fluid 146. The shear strength of the fluid 146 is sufficient, together with the clamping force of the fastener 130, to block movement of the first part 126 of the steering column 122 relative to the second part 128.

When it is desired that the first part 126 of the steering column 122 be able to move relative to the second part 128 of the steering column, in order to reduce load on the vehicle driver from contact with the steering wheel, the coil assembly 144 is energized in a manner that provides a magnetic field that reduces the shear strength of the fluid 146. The reduced shear strength of the fluid 146 allows the shear capsule 142 to break and thus allows the first part 126 of the steering column 122 to move relative to the second part 128.

From the above description of the invention, those skilled in the art will perceive improvements, changes and modifications in the invention. For example, if the fluid used is an electrorheological fluid, then its viscosity is varied by varying the electrical field acting on the fluid, rather than the magnetic field. Such improvements, changes and modifications within the skill of the art are intended to be covered by the appended claims.

Having described the invention, we claim:

1. An apparatus for supporting a steering wheel of a vehicle, said apparatus comprising:

a first steering column part;

a second steering column part;

supporting structure supporting said first steering column part and the vehicle steering wheel for movement relative to said second steering column part along an axis;

an energy absorbing device interposed between said first steering column part and said second steering column part for resisting movement of said first part relative to said second part, said energy absorbing device comprising a fluid having a shear strength which varies in response to an energy field acting on said fluid; and means for varying the shear strength of said fluid by varying said energy field to vary the resistance to movement of said first steering column part relative to said second steering column part.

2. An apparatus as set forth in claim 1 wherein said fluid is an electrorheological fluid whose shear strength varies in response to a change in voltage varying an electric field acting on said fluid.

3. An apparatus as set forth in claim 1 wherein said fluid is an electrorheological magnetic fluid whose shear strength varies in response to a change in magnetic field acting on said fluid.

4. An apparatus as set forth in claim 1 wherein said means for varying the shear strength of said fluid by varying said energy field comprises:

at least one vehicle condition sensor operative to sense a vehicle condition and to provide a first output signal;

at least one occupant condition sensor operative to sense an occupant condition and to provide a second output signal; and a controller for receiving said first output signal and said second output signal and for, in response, controlling said energy field to control the resistance to movement of said first steering column part relative to said second steering column part.

5. An apparatus as set forth in claim 4 wherein said controller is operative to vary said energy field prior to onset of a vehicle crash condition and is operative to vary said energy field in response to conditions sensed after the onset of the vehicle crash condition.

6. An apparatus as set forth in claim 1 wherein said second steering column member comprises an annular capsule containing said fluid and said first steering column part comprises a member fixed for movement with the vehicle steering wheel and that extends through said capsule.

7. An apparatus as set forth in claim 6 wherein said means for varying the shear strength of said fluid comprises a coil extending around said capsule of fluid and a controller for controlling flow of electric current through said coil to vary said energy field.

8. An apparatus as set forth in claim 1 wherein said energy absorbing device comprises a shear capsule containing said fluid, a coil extending around said shear capsule and generating said energy field acting on said fluid, and a controller for controlling flow of electric current through said coil to vary said energy field.

9. An apparatus for supporting a steering wheel of a vehicle, said apparatus comprising:

a first steering column part;

a second steering column part;

supporting structure supporting said first steering column part and the vehicle steering wheel for movement relative to said second steering column part along an axis;

an energy absorbing device interposed between said first steering column part and said second steering column part for resisting movement of said first part relative to said second part, said energy absorbing device comprising a fluid having a shear strength which varies in response to an energy field acting on said fluid; and means for varying the shear strength of said fluid by varying said energy field to vary the resistance to movement of said first steering column part relative to said second steering column part, wherein said energy absorbing device comprises a shear bolt containing said fluid, and wherein said means for varying the shear strength of said fluid comprises a coil extending around said shear bolt and generating said energy field acting on said fluid, and a controller for controlling flow of electric current through said coil to vary said energy field.

* * * * *